United States Patent [19]

Semler et al.

[11] Patent Number: 5,409,025
[45] Date of Patent: Apr. 25, 1995

[54] APPARATUS AND METHOD FOR CLEANING UNDERGROUND LIQUID FUEL STORAGE TANKS

[75] Inventors: Loren H. Semler, Lake Forest; Jon Clegg, Elmhurst; Joseph Palm, Lombard; William E. Schulz, Elk Grove Village, all of Ill.

[73] Assignee: Semler Industries Inc., Franklin Park, Ill.

[21] Appl. No.: 132,717

[22] Filed: Oct. 6, 1993

[51] Int. Cl.⁶ .............................................. B08B 9/12
[52] U.S. Cl. ................................ 134/111; 134/166 R; 134/169 R; 134/172
[58] Field of Search .......... 134/167 C, 168 C, 169 C, 134/172, 111, 167 R, 88, 168 R, 166 R, 169 R

[56] References Cited

U.S. PATENT DOCUMENTS

| | | |
|---|---|---|
| 787,389 | 4/1905 | Moorhead . |
| 868,901 | 10/1907 | Williams . |
| 1,545,896 | 7/1925 | Hanlon .............................. 134/167 R |
| 1,552,998 | 9/1925 | Menge . |
| 2,647,639 | 8/1953 | Grein .................................... 210/207 |
| 2,910,077 | 11/1959 | Blake et al. ......................... 134/168 |
| 3,245,420 | 4/1966 | Cherney ............................. 134/101 |
| 3,428,257 | 2/1969 | Kentfield et al. ............. 239/265.35 |
| 3,808,631 | 5/1974 | Shibata et al. ......................... 15/321 |
| 4,015,613 | 4/1977 | Papworth ............................ 134/102 |
| 4,243,446 | 5/1981 | Terlesky et al. ....................... 141/17 |
| 4,426,233 | 1/1984 | Manare ............................. 134/88 X |
| 4,578,198 | 3/1986 | Schmidt et al. .............. 134/167 CX |
| 4,592,378 | 6/1986 | Frentzel ............................. 134/1117 |
| 4,838,768 | 6/1989 | Flaherty ......................... 134/167 C |
| 5,065,789 | 11/1991 | Cox ................................... 134/113 X |
| 5,079,799 | 1/1992 | Matter et al. ................... 134/167 R |
| 5,087,294 | 2/1992 | Rechtzigel ....................... 134/168 R |

FOREIGN PATENT DOCUMENTS

| | | | |
|---|---|---|---|
| 62-115588 | 1/1987 | Japan .............................. 134/167 R |
| 2179244 | 3/1987 | United Kingdom ............ 134/167 R |

OTHER PUBLICATIONS

EP 32,813 Jul. 1981.

*Primary Examiner*—Frankie L. Stinson
*Attorney, Agent, or Firm*—Tilton Fallon Lungmus

[57] ABSTRACT

An apparatus and method are disclosed for cleaning and removing particulates from underground liquid fuel storage tanks which typically have restricted access openings to the interior thereof. The apparatus is provided with a main fuel pump having an inlet and outlet, an inflow passage communicating with the pump inlet for conducting fuel to the pump from an underground liquid storage tank, and an outflow passage communicating with the pump outlet for returning fuel from the pump to the same underground tank. The inflow passage is provided with protective strainer and a jet pump for increasing and maintaining the rate and velocity of fuel flowing therethrough to the main pump. The method of the present invention involves the steps of first dislodging, suspending, and removing particulates from the tank by withdrawing the fuel and suspended particulates from the tank through an outer passage of a coaxial hose, filtering the particulates from the fuel, and discharging filtered fuel back into the tank through an inner passage of the coaxial hose at a high velocity to dislodge and suspend particulates in the tank into the fuel.

13 Claims, 5 Drawing Sheets

APPARATUS AND METHOD FOR CLEANING UNDERGROUND LIQUID FUEL STORAGE TANKS

BACKGROUND AND SUMMARY

Gasoline stations, manufacturing plants, fleet garages, private fueling facilities, and the like typically use underground storage tanks to hold large quantities of volatile fluids which can be withdrawn from the tank and then dispensed in limited quantities at the aboveground site. Typical gasoline stations have multiple underground tanks for holding different grades of fuel, and the tanks are provided with pumps to transport the fuel to metered pumps used by the consumer to dispense the fuel into a car, truck, or the like. Underground storage tanks have the advantages of not taking up valuable aboveground space and have certain safety features, especially with respect to flammable fluids such as fuel. However, the interior of such underground tanks are prone to accumulate dirt and debris which may contaminate the fluid contained therein, and cleaning such underground tanks can be exceedingly difficult.

Underground liquid fuel tanks are one type of tank that typically accumulates troublesome amounts of sludge and debris in various ways over a period of time. For example, small objects, such as stones, may inadvertently be dropped into the tank through access openings when the tank is drained, filled, or its pumps or other accessories are serviced. In addition, impurities are introduced into the fuel by the air that must enter the tank through a vent or opening to replace the fluid as it is extracted. This air often contains moisture, dust, and microorganisms that degrade the fuel and accumulate within the tank's interior. These impurities may result in the character of the fuel changing, the interior surfaces of the tank oxidizing, and troublesome growth of microorganisms in the tank. Some microorganisms are known to thrive in gasoline and to feed on the additives typically found in gasoline and the metabolic processes of these microorganisms tend to produce in time a type of sludge within the tank which is characterized differently (and may be of substantially different composition) in different parts of the country. In the south, a red sludge typically develops that is called "red gravy" and in northern states, such as Wisconsin, the sludge has been found to be grayish white and is known as "white gravy". Over a period of time, the deposits in the lower levels of the tank become substantial and the activity and growth of the microorganisms becomes so significant that pumps, meters, dispenser filters, level probes, etc. need frequent service, repair or replacement and, in extreme cases, fuel held in the tanks is no longer acceptable for use.

Other systems and methods are known in the art for cleaning underground tanks. For example, Gorman-Rupp of Ohio markets a system in which a hose is extended down through an access opening of an underground tank and slowly moved along the bottom of the tank to draw out sludge and particles. The extracted mixture of fuel and contaminants are then pumped to a tank, such as a 55 gallon drum, for later disposal. It is believed that such a system is only marginally effective at best as the hose only removes limited amounts of sludge and debris close to its inlet and the operator cannot see into the tank to determine the location of such debris and whether the entire tank has been cleaned. Another means for cleaning underground fuel tanks involves draining the tank of fuel, filling the tank with water or nitrogen, cutting an opening large enough to permit entry of a person into the top of the tank, draining the water or venting the nitrogen out of the tank, lowering a person into the tank to manually scrub out the interior, and subsequently rewelding or sealing the top of the tank. It is believed that such systems are relatively crude, expensive, time-consuming, and often dangerous.

Other apparatus and methods are known for cleaning aboveground storage tanks but it is believed that such methods are impractical for use with underground liquid fuel storage tanks. One such known method is introducing a nozzle into an access port at the top of a tank, spraying the tank with a cleaning agent, and then draining the cleaning agent out of an access opening at the bottom of the tank. Obviously, such a method will not work with an underground storage tank. Another method is disclosed in U.S. Pat. No. 4,015,613, issued to Papworth, which discloses an apparatus having a coaxial hose that is inserted into and used to clean aboveground tanks of the type used in automobiles or the like. The coaxial hose has an outer tube for drawing fluid from the tank and an inner tube for discharging fluid back into the tank. The fuel discharged through the inner tube produces turbulence in the tank to suspend sediment and other particles in the fluid which is then drawn out through the outer tube for external filtering. While this system might be effective in cleaning small aboveground tanks, it is believed impractical for use with underground liquid fuel storage tanks. This is due to the nature of typical underground liquid fuel storage tanks which have restricted access openings (in accordance with Health and Safety Codes) of about 4 inches in diameter, bottom levels which typically lie at depths of 11 feet or more below the ground, and large volumes as such underground tanks typically have diameters of 8 or more feet and lengths of 10 to 60 feet. In order to achieve effective cleaning of such an underground liquid fuel storage tank using a coaxial hose as disclosed in Papworth, the fuel would have to be circulated at a high flow rate so that the cleaning process could be completed in a reasonable amount of time and the fuel would have to be discharged into the tank at a high velocity so that the discharged fuel would impact a greater area of the surfaces of the interior of the tank. However, the restricted access openings of 4 inches mandate that such a coaxial hose have a small diameter and thus hoses of larger diameter cannot be used to increase the flow rate through such a coaxial hose. Furthermore, the pump speed to increase the flow rate would decrease the Net Positive Suction Head (NPSH) of the pump in Papworth. If such a system were used on an underground storage tank containing volatile liquids such as gasoline which typically have very high vaporization pressures, the NPSH required from the pump to draw fuel at higher flow rates and velocities through the coaxial hose would cause the fuel to vaporize in the pump, resulting in cavitation and possible damage to the pump. It has been found that if such a coaxial hose having a diameter of less than 4 inches is used to draw fuel from an underground liquid fuel storage tank, the flow rate through an outer passage of the coaxial hose cannot exceed approximately 20 gallons per minute without causing the fuel to vaporize at pockets of high vacuum pressure in the pump. Papworth further discloses a practical embodiment in which the filtered fuel is discharged back into the tank through an inner passage of the coaxial hose which has an inside diameter of ⅝ inch and a fuel pressure of about 18 to 20 psi. It is believed that such a practical embodiment would result in the fuel having a velocity of approximately 15 to 20 feet per second. While such a flow of fuel might be effective in cleaning aboveground tanks of limited size, it is believed that underground storage tanks are typically larger and would require higher flow rates and velocities to effectively achieve agitation and filtering of the fluid contained therein in a reasonable period of time.

An important aspect of the present invention therefore lies in the discovery of an effective and efficient apparatus and method for cleaning underground liquid fuel storage tanks which employs the fuel in the tank as a cleaning agent, is capable of circulating and filtering the fluid at high flow rates, and discharges the fluid back into the tank at high velocities to dislodge and suspend particulates from the interior surfaces of the tank in the fuel for removal by the filtering process. In brief, the apparatus of the present invention comprises a main fuel pump having an inlet and outlet, a first passage-providing means defining an inflow passage communicating with the pump inlet for conducting fuel to the pump from an underground liquid fuel storage tank, and a second passage-providing means defining an outflow passage communicating with the pump outlet for returning fuel from the pump to the same underground tank. A filtering means is provided along the outflow passage for filtering fuel flowing therethrough. A jet pump means having a discharge nozzle is provided in the first passage-providing means and is directed towards the pump inlet for increasing the rate and velocity of fuel flowing through the inflow passage from the underground tank to the main pump. The jet pump means includes a fuel intake for receiving fuel from a flow-diverting conduit means which conducts a minor portion of the fuel flowing through the outflow passage, after such fuel is partially filtered by said filtering means, to the intake of the jet pump means. A hose means is used for connecting the inflow and outflow passages to the interior of the underground liquid fuel storage tank. In one embodiment of the invention, the hose means takes the form of a coaxial hose having proximal and distal ends with outer and inner passages running therebetween. At the proximal end, the outer passage is connected to the inflow and the inner passage is connected to the outflow while at the distal end, a nozzle is provided with discharge and intake ports respectively connected to the inner and outer passages. The main pump and jet pump means are operable in this embodiment to draw fuel from the tank into the intake ports at a flow rate of at least 25 gallons per minute, and preferably at 35 to 50 gallons per minute, and discharge the fluid back into the tank through the discharge ports at a velocity of at least 25 feet per second, and preferably at 35 to 50 feet per second. The coaxial hose preferably has an outer diameter of less than 4 inches and a length of at least 25 feet. By employing the jet pump means to increase the flow rate and velocity of the fuel flowing through the inflow passage and into the inlet of the main fuel pump, the NPSH required from the main fuel pump is satisfied to such a degree that the fuel will not vaporize in the pump when the apparatus is used to circulate and filter fuel at high flow rates and velocities.

In another embodiment, the hose means takes the form a first hose having a proximal end connected to the outflow and a distal end including a nozzle means for discharging fluid into the tank, and a second independent suction hose having a proximal end connected to the inflow and a distal end including inlet means for drawing fluid from the tank into the suction hose. The main pump without the aid of the jet pump in this embodiment is operable to withdraw fluid from the tank at a flow rate of at least 70 gallons per minute, and preferably at a rate of approximately 80 to 110 gallons per minute. The first and second hoses have outer diameters of less than 4 inches to fit through the restricted access openings of typical underground tanks and lengths of at least 25 feet to enable the hoses to reach the fluid at the bottom of the tank. The coaxial hose used in the first embodiment may be employed as the first hose in this embodiment to conserve materials and negate the need to transport an additional hose along with the apparatus to sites at which an underground liquid fuel storage tank is to be cleaned.

The present invention also involves the discovery of a method for cleaning and removing particulates from an underground liquid fuel storage tank containing a predetermined quantity of fuel. Such a method comprises the steps of first dislodging, suspending, and removing particulates from the underground tank by introducing a coaxial hose into the tank through an access opening until a nozzle at the lower end of the hose is located adjacent the bottom of the tank beneath the fuel level, and withdrawing fuel and particulates through the nozzle into an outer passage of the coaxial hose, circulating the fuel through filters and into a reservoir, and thereafter withdrawing filtered fuel from the reservoir and reintroducing the filtered fuel at a high velocity into the tank through an inner passage of the coaxial hose and the nozzle. The method also involves the steps of advancing the nozzle along the bottom of the tank while continuing the dislodging, suspending, and removing operation for a selected interval, and thereafter sweeping the tank by introducing a second hose into the tank through a second access opening, said second hose having an intake opening at its lower end. The intake opening is positioned in a direction facing the nozzle of the coaxial hose, and fuel is withdrawn from the tank by means of the second hose. The fuel is then filtered and introduced into the same reservoir, and the fuel is subsequently withdrawn from the reservoir and reintroduced at a high velocity into the tank through both the inner and outer passages of the coaxial hose and nozzle. The nozzle of the coaxial hose can be oscillated to dislodge and suspend particulates in the tank which are drawn by the intake of the second hose for effective removal of particles and sediment contained therein. In another embodiment, a pre-sweeping or vacuuming stage can be performed first by introducing the coaxial hose into the tank until the nozzle is located beneath the fuel level, introducing a second hose into the tank through a second access opening, the second hose having an intake opening at its lower end, positioning the intake opening in a direction facing the nozzle of the coaxial hose, withdrawing fuel from the tank by means of the second hose, then filtering the fuel and introducing the same into a reservoir, and thereafter withdrawing the fuel from the reservoir and reintroducing the fuel at high velocity into the tank through both inner and outer passages of the coaxial hose and nozzle. The intake end of the second hose can be oscillated during the vacuuming stage over the bottom of the tank to remove deposits of particulates and sediment disposed thereon.

During the operation where the coaxial hose is used to dislodge, suspend, and remove particulates from the tank, the fuel is withdrawn through the outer passage of the coaxial hose at a flow rate of at least 25 gallons per minute, and preferably at a rate of 35 to 50 gallons per minute, and the fuel is returned to the tank through the inner passage and nozzle at a velocity of at least 25 feet per second, and preferably between 35 and 50 feet per second. In the embodiments where a second hose is employed, the fuel is circulated at a flow rate of at least 75 gallons per minute, and preferably at a rate of 80 to 110 gallons per minute. Such high velocities and flow rates are effective for dislodging and suspending particulates in the fuel and filtering such particulates from the fuel within a reasonable time period.

Other advantages, objects and features of the present invention will become apparent from the specification and drawings.

DETAILED DESCRIPTION OF PREFERRED EMBODIMENTS

Referring to the drawings, the numeral 10 generally designates the apparatus of the present invention having a main fuel pump 11 with an inlet 12 and outlet 13. Main fuel pump 11 is preferably a positive displacement pump that does not require priming, and one suitable type of pump is a sliding vane pump which is commercially available from Blackmer of Grand Rapids, Mich. A first passage-providing means defining an inflow passage 14 is provided for conducting fuel to pump inlet 12 from an intake 15 that is adapted to connect with a means for receiving fuel from an underground tank. A second passage-providing means defining an outflow passage 16 is provided for conducting fuel from pump outlet 13 to a discharge outlet 17 that is adapted to connect with a means for returning fuel to the tank. Main fuel pump 11 and inflow and outflow passages 14 and 16 are preferably mounted upon a drip pan 18 that serves as a base for the apparatus. Drip pan 18 is preferably imperforate with the exception of a drain plug 19 which allows drainage of fluid that may accumulate on the drip pan.

Figure 1:
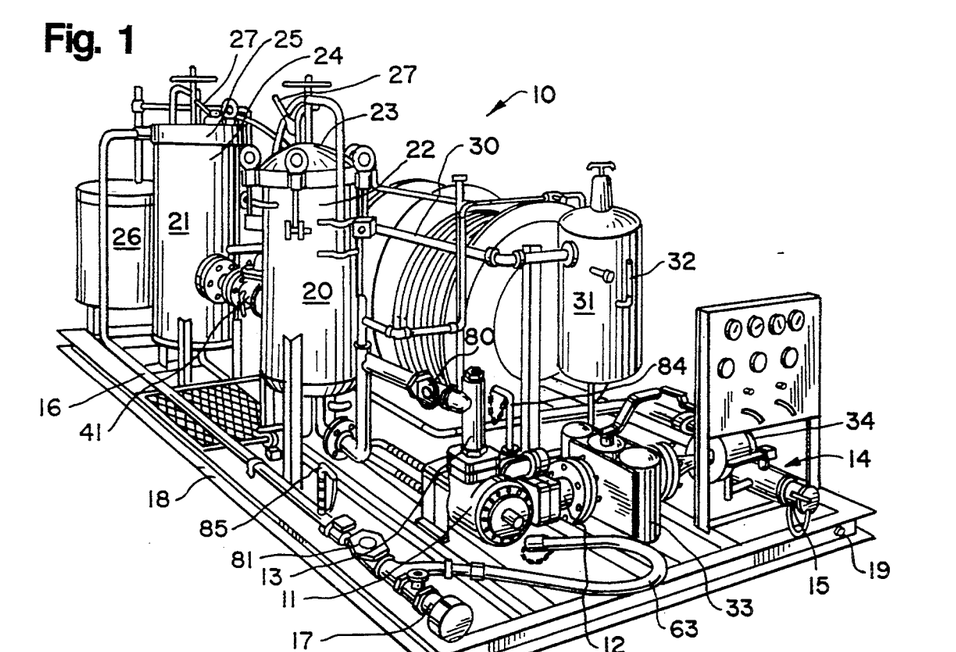
FIG. 1 is a perspective view of the apparatus embodying the present invention.

A filtering means is provided along the second passage-providing means for filtering fuel flowing therethrough and is shown in FIG. 1 as a first bag filter 20 and a second cartridge filter 21. In the embodiment shown, bag filter 20 consists of a canister 22 having a removable top 23 and is adapted to contain multiple mesh bag filters (not shown) for filtering impurities and particulates from fuel flowing therethrough. The mesh bag filters preferably have micron ratings of 10 to 100 microns for removing larger impurities and particulates from the fuel. Once the mesh bags are contaminated so as to be no longer usable, top 23 can be opened and a new bag filter can be inserted therein. Outflow passage 16 connects bag filter 20 to cartridge filter 21 which includes a housing 24 and a removable top 25 for allowing access to the housing's interior. Multiple internal cartridge filters (not shown) are contained in housing 24 for removing further particulates from the fuel flowing therethrough, and the cartridge filters preferably have micron ratings of 0.8 to 10 microns. It is believed that such a multiple stage filtering process of the fuel is efficient and economical, but it will be understood by those skilled in the art that other filtering means may also be employed.

A reservoir in the form of a static relaxation tank 26 is provided in outflow passage 16 downstream from bag and cartridge filters 20 and 21. Static relaxation tank 26 is employed to dissipate static electricity from building in the fuel which might otherwise cause a spark and possible combustion of the fuel.

Figure 12:
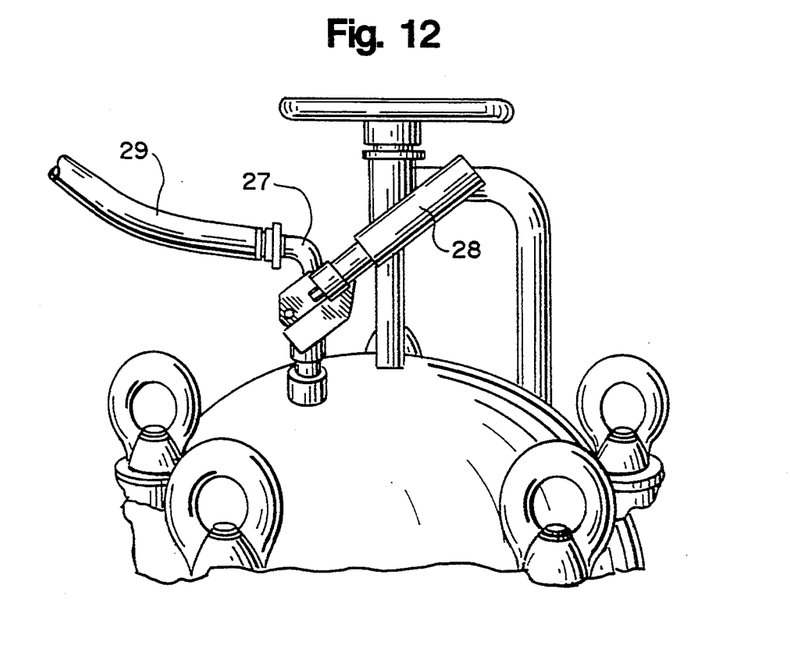
FIG. 12 is a perspective view of the top of the bag filter, illustrating an air/vapor release valve for use with the present invention.

Bag filter 20, cartridge filter 21, and static relaxation tank 26 are all provided with air/vapor venting valves 27 for allowing discharge of trapped air and vapors from the respective interior chambers. Such air and vapors typically accumulate when the cartridge or bag filters are changed or when the system is re-started after periods of non-use. Such air/vapor venting valves are standard in the art and one embodiment of such a valve is most clearly seen in FIG. 12. Air/vapor venting valve 27 includes a handle 28, which when depressed, allows pressurized air in the respective housing to escape and flow into bleed line 29. Each of the air/vapor venting valves is provided with such a bleed line which is in communication with a conduit 30. Conduit 30 is connected to a spit tank 31 for venting the pressurized air and vapors and for receiving the small quantity of fuel which often flows into the bleed lines along with the trapped air and vapors. A sight gauge 32 is provided on spit tank 31 for determining when its capacity has been reached. Once full, spit tank 31 can be drained into a disposal means or the fuel can be returned to the underground tank.

The first passage-providing means is provided with a strainer means for removing large particulates or objects from the fuel which passes through inflow passage 14. The straining means is shown as a multi-chamber (duplex) strainer 33. Such a strainer is conventional and includes a passageway for communicating the fluid through a plurality of screened baskets (not shown) which can be easily removed and cleaned. The primary purpose of strainer 33 is to remove large objects or particulates that may take the form of stones, gravel, pens, or other objects which might damage main fuel pump 11.

A jet pump means, generally designated at 34, is provided for increasing the rate and velocity of fuel flowing through inflow passage 14 from the underground tank and to the inlet 12 of main pump 11. As seen most clearly in FIG. 8, jet pump 34 includes a discharge nozzle 35 directed towards pump inlet 12 and positioned to receive fuel from an intake 36. Nozzle 35 increases the velocity of the fuel received from intake 36. The fuel passes from nozzle 35 into a chamber 37 where the fuel entrains the fuel entering intake 15, increasing the rate and velocity of the fluid drawn through the intake. The fuel from intake 15 and nozzle 35 then flows through chamber 37 and into an elongate parallel section 38. Jet pumps 34 can be any suitable commercially obtainable pump. It has been found that a jet pump (model LL 2½) manufactured by Penberthy Houdaille, of Prophetstown, Ill., is suitable for such purposes.

Figure 2:
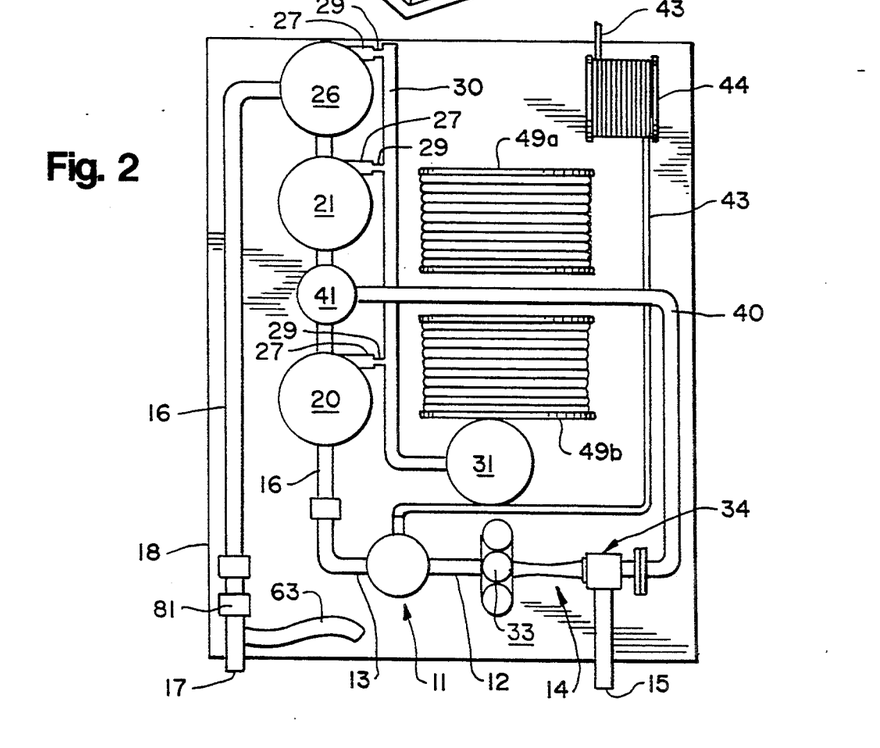
FIG. 2 is a schematic view of the apparatus of the present invention.

Referring to FIG. 2, a flow-diverting conduit means 40 is provided for conducting a minor portion of the fuel flowing through outflow passage 16, after such fuel is partially filtered by the filtering means 20, to intake 36 of jet pump 34. The junction between flow-diverting conduit 40 and outflow passage 16 includes a control valve 41 that is pressure regulated to divert fuel from outflow passage 16 in amounts which will maximize the flow rate and velocity of the fuel flowing through inflow passage 14. Such control valves are well known in the art and one type of suitable control valve is commercially available from Cla-Val Co. of Newport Beach, Calif.

Due to the restricted access openings and the depth of typical underground liquid fuel storage tanks, any coaxial hose or communicating means used for conducting fuel to intake 15 should have a diameter of less than 4 inches and a length of at least 25 feet, depending upon the particular application. The restricted diameter of such a coaxial hose limits the potential flow rate therethrough and thus suitably high flow rates and velocities of fuel can only be obtained by increasing the Net Positive Suction Head (NPSH) supplied to the pump which draws the fuel into the hose. The NPSH required by the pump to achieve such high flow rates and velocities is exceeded in situations where a coaxial hose is used to connect the apparatus with the fuel in the underground tank. This is due to the fact that fluid passing through the outer passage of the coaxial hose incurs friction at the interior and exterior surfaces of the outer passage and has limited area. If only main pump 11 were utilized to draw fuel through the hose, fuels such as gasoline would vaporize in the pump as the NPSH required to achieve effective flow rates and velocities would be less than the vaporization pressure of the fuel in the pump. For example, typical gasoline has a vapor pressure of 8 to 12 psi and it is believed that the vacuum conditions required to exceed a flow rate of 20 gallons per minute in a coaxial hose having a 4 inch diameter and a length greater than 25 feet would cause the gasoline to vaporize in the pump. Such vaporization typically occurs at the backside of blades or vanes in the pump where pockets of increased vacuum pressure exist (cavitation). The present invention overcomes this problem by employing jet pump means 34 which provides a certain amount of pressure to the fuel entering intake 15 and flowing through inflow passage 14. This satisfies the NPSH requirement of the main fuel pump 11 to a valve at which the fuel will not vaporize in the main pump. Jet pump 34 therefore allows the apparatus to be used to circulate large volumes of fuel at high flow rates and velocities in short periods of time without the danger of cavitation occurring in the pump. Specific flow rates and velocities will depend upon the particular means used for connecting intake 15 and outlet 17 with the fuel contained in the underground tank and will be discussed in detail below in connection with particular modes of operation.

Figure 6:
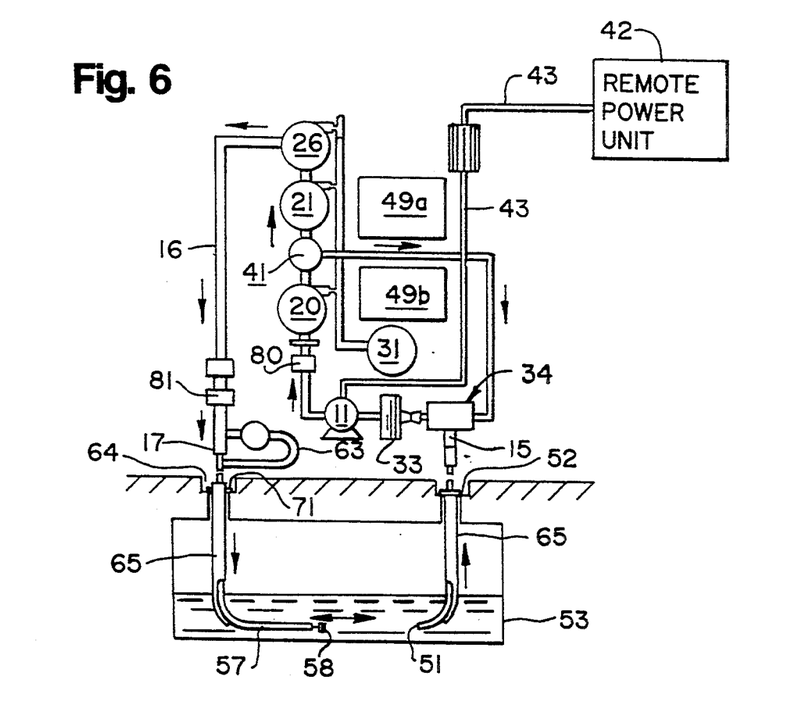
FIG. 6 is a schematic view of the apparatus and an underground liquid fuel storage tank illustrating the sweeping stage of the present invention.
Figures 7, 8:
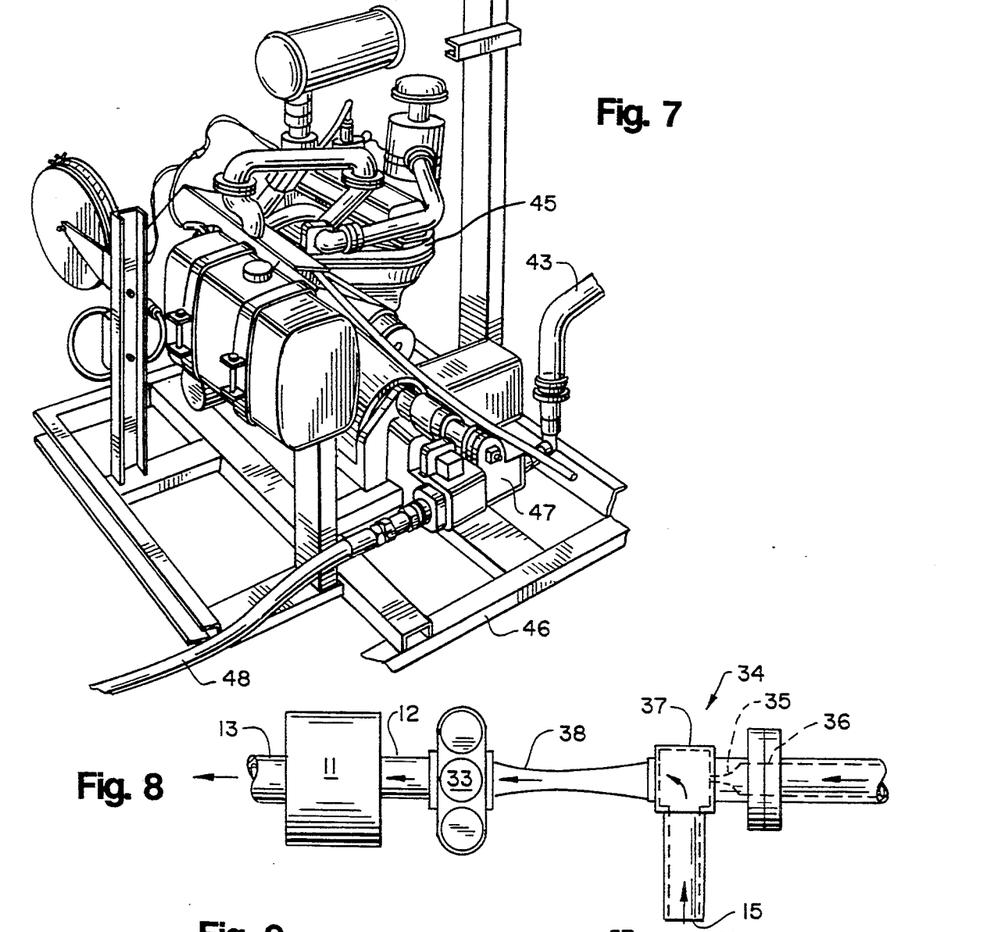
FIG. 7 is a perspective view illustrating one embodiment of a remote power source.
FIG. 8 is a schematic cross-sectional view of one embodiment of the jet pump means of the present invention.

Main pump 11 requires a power source and, due to the flammable nature of most fuels, it is preferable if electric or combustion-type power source is not used in close proximity to the apparatus. The present invention therefore employs a remote power source 42 to provide a working fluid through a conduit 43 to a hydraulic motor used to drive main pump 11 (see FIGS. 3–6). Hydraulic fluid is preferably used to drive main pump 11 but other media such as air in a pneumatic system may also be used. A dual reel 44 is provided on drip pan 18 for coiling the portions of hoses 43 that extend to the remote power source during periods of non-use or transportation. FIG. 7 depicts one type of remote power source that may take the form of a stand-alone combustion engine 45 mounted upon a frame 46 and connected to a pump 47. Pump 47 is connected to conduits 43 for providing hydraulic fluid to and from the apparatus from a hydraulic fluid reservoir (not shown) which is also connected to pump 42 by a similar conduit 48. Although a stand-alone combustion engine is an effective power source, other means such as a power take-off from a diesel truck or a pneumatic compressor can also be employed as the remote power source. It is suggested that the remote power source be placed at least 50 feet away from the apparatus to ensure safe operation of the system. It is also suggested that a dead man switch (not shown) be attached to the system such that if an operator lets go of the switch, the apparatus will automatically shut down by stopping the remote power source and thus the flow of hydraulic fluid through lines 43 to and from the hydraulic motor used to drive main pump 11.

A large pair of reels 49a and 49b are provided on drip pan 18 for storing hoses for connecting the inflow and outflow passages to the interior of an underground liquid fuel storage tank Generally, the hose means can take the form of one hose that has one passage running therethrough and a second coaxial hose having inner and outer passages running therethrough. Such hoses will be more fully discussed in connection with their modes of use below.

Figure 3:
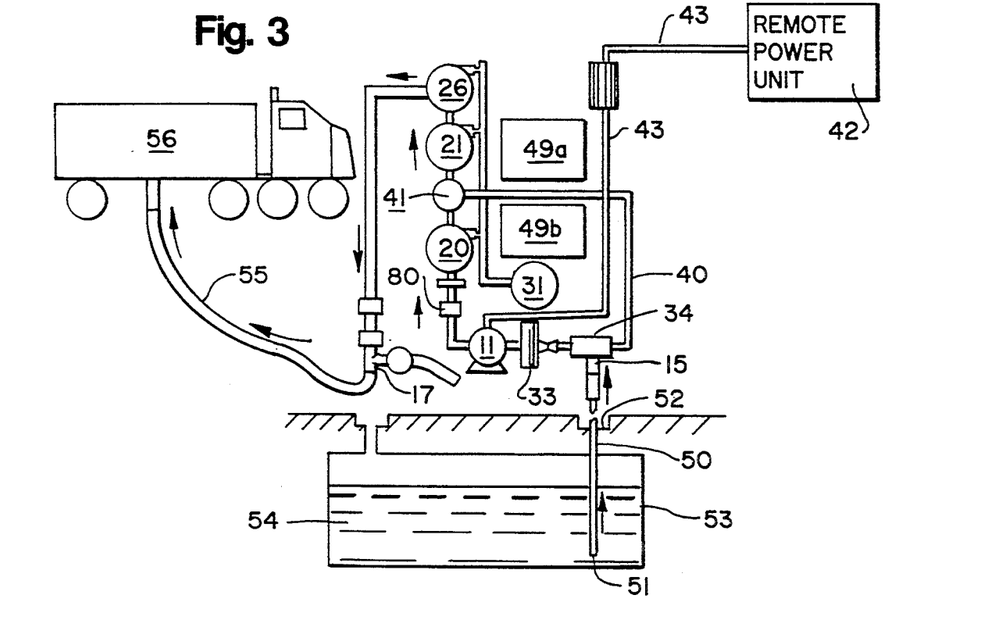
FIG. 3 is a schematic view of the apparatus of the present invention and an underground liquid fuel storage tank, illustrating the off-loading stage.

The apparatus and method of the present invention preferably operate with the level of fuel in the underground storage tank at a level of approximately 5 to 20% of the height of the tank. It is believed that this amount of fuel is optimal as it provides enough of a fluid medium for entraining particulates and debris for removal from the tank while not being too large of a quantity which would take excessive amounts of time to circulate. Preferably, the level of fuel in a particular tank is reduced to such a height before the apparatus is transported to the underground tank site. However, in situations where this has not been done, the apparatus of the present invention can be used in an off-loading stage as depicted in FIG. 3. In the off-loading mode of operation, a single passage hose 50 has its proximal end connected to intake 15 and its distal end having an intake opening 51 is introduced through an access opening 52 into underground liquid fuel storage tank 53 which contains a quantity of fuel 54 therein. Main fuel pump 11, being of the positive displacement type, does not require priming and starting pump 11 will draw fuel through intake opening 51 and into hose 50. Use of jet pump 34 is not required during this stage as the apparatus is being used to merely reduce the level of fuel in the tank. During the operation, fuel 54 is drawn into hose inlet 51, through inflow passage 14 and main pump 11, and into outflow passage 16 where the fuel is filtered by bag filter 20 and cartridge filter 21. A second hose 55 (preferably provided by the site or a fuel truck to conserve space on apparatus 10) is connected at one end to outlet 17 for receiving fuel from outflow passage 16 and at the other end to an aboveground storage tank such as a fuel truck 56. Main pump 11 is operated until the level of fuel in the tank is reduced to a height of approximately 5 to 20% of the height of the tank. Note that when the fuel is being off-loaded to an external storage tank such as a fuel truck, it is preferable that the filtering means be used to clean and filter the fuel so that contaminated fuel is not disposed into the fuel truck.

Once the level of fuel in a particular tank is reduced to such a predetermined height, apparatus 10 can be used to clean and remove particulates from the tank using three basic modes of operation. Generally, the first mode involves pre-sweeping or vacuuming the interior of the tank to remove large deposits of particulates therefrom (FIG. 4), the second mode involves dislodging, suspending, and removing particulates from the tank using a coaxial hose (FIG. 5), and the third mode of operation involves sweeping the tank using a pair of hoses (FIG. 6). The second and third modes of operation form central features of the present invention and the first mode of pre-sweeping or vacuuming the tank is optional, but inclusion of the first mode is preferred to ensure thorough cleaning of the underground tank.

Figure 4:
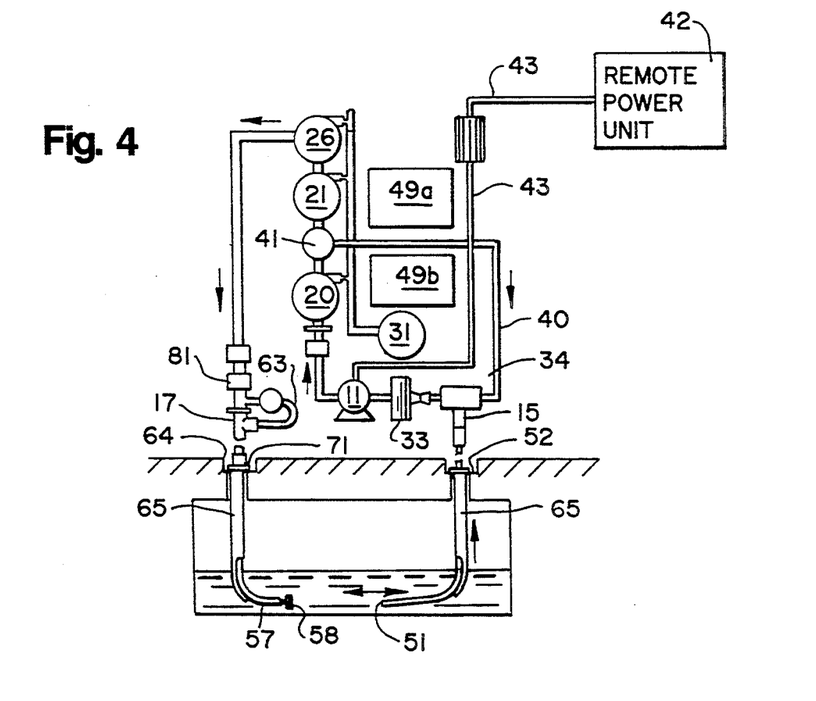
FIG. 4 is a schematic view of the apparatus and an underground liquid fuel storage tank illustrating the pre-sweeping or vacuuming stage of the present invention.
Figure 9:
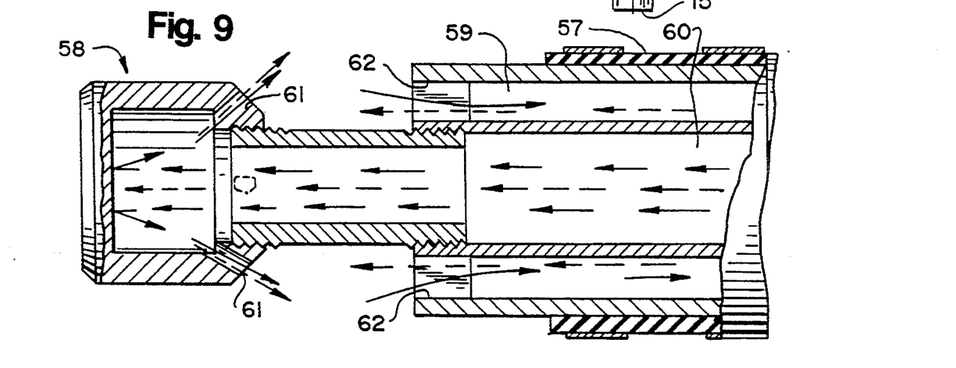
FIG. 9 is a cross-sectional view of the nozzle end of the coaxial hose employed in the present invention.
Figure 10:
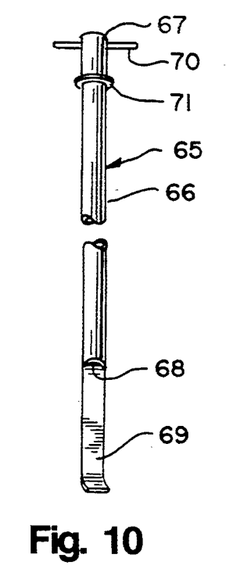
FIG. 10 is a perspective view of a guide tube that can be used with the apparatus and method of the present invention.

The first mode of using apparatus 10 to pre-sweep or vacuum the interior of the tank to remove large deposits of particulates or debris is shown in FIG. 4. In this embodiment and mode of operation, the hose means preferably takes the form of single passage hose 50 having inlet 51 at its distal end and a coaxial hose 57 having a nozzle 58 at its distal end. Although a single passage hose may be substituted during this mode of operation for coaxial hose 57, it is preferable that coaxial hose 57 be used as such a coaxial hose is required for later modes of operation and this eliminates the need for an extra hose. FIG. 9 depicts a distal end of coaxial hose 57 and illustrates the outer and inner passages 59 and 60 running therethrough. Nozzle 58 includes discharge ports 61 which are in communication with inner passage 60, and ports 62 which are in communication with outer passage 59. In FIG. 4, coaxial hose 57 is connected to outlet 17 such that outflow passage 16 is in communication with outer passage 59 and a flexible hose 63 is used to connect outflow passage 16 with inner passage 60. Such an arrangement results in fuel flowing through outflow passage 16 being conducted through both the inner and outer passages of the coaxial hose and being discharged through both the discharge ports 61 and ports 62. Coaxial hose 57 is introduced into tank 53 through an access opening 64, preferably with the use of a guide tube 65. Guide tube 65 is used to guide and maneuver the coaxial hose and nozzle through access opening 64 and into proper placement along the bottom of the tank and below the level of fuel. FIG. 10 more clearly shows guide tube 65 which comprises an elongate tube 66 having an opening 67 for receiving the coaxial hose and a distal opening 68 for allowing the coaxial hose to pass out of the bottom of the tube. A curved flange 69 is provided at the bottom of guide tube 65 to urge the distal end of the coaxial hose to extend a distance into the tank in a direction parallel with the bottom thereof. Handle 70 is provided for rotating the coaxial hose and thus causing nozzle 58 to oscillate back and forth over the bottom of the tank. A locking member 71 is provided for fixing the distance that guide tube 65 is inserted through an access opening. For example, guide tube 65 can be inserted through opening 64 until it contacts the bottom of the tank, the guide tube can then be lifted a distance of 6 to 12 inches, and locking ring 71 can then be secured around the tube and tightened against the periphery of access opening 64 to lock the tube in place. Coaxial tube 57 can then be inserted therethrough and manipulated by inserting and withdrawing the hose or by applying a twisting motion to handle 70. Hose 50, inserted into the tank through a guide tube 65, can be similarly moved about the interior of the tank by withdrawing or inserting the hose or applying a twisting motion thereto.

The vacuuming or pre-sweeping mode of the present invention is accomplished by introducing coaxial hose 57 through access opening 64 and introducing hose 50 into guide tube 65 in access opening 52 as shown in FIG. 4. Nozzle 58 of coaxial hose 57 is preferably positioned facing inlet 51 of hose 50. During this mode, main pump 11 draws fluid through intake 51 into hose 50 and into inflow passage 14. Strainer 33 removes any large objects from the fuel so that main pump 11 will be not damaged. The fuel then passes through pump outlet 13 and into outflow passage 16 where it is filtered by bag filter 20 and cartridge filter 21. The fuel then flows through outlet 17 and flexible hose 63 and then into both the outer and inner passages 59 and 60 of coaxial hose 57. The fuel is then discharged back into the tank through both the inner and outer passages of the coaxial nozzle in the directions indicated by dashed arrows in FIG. 9. Preferably, hose 50 is moved during this mode such that inlet 51 is oscillated back and forth over the bottom of tank 53 to draw large deposits of particulates, debris or sludge disposed thereon into inlet 51 of hose 50 for subsequent filtering and removal from the fuel. It has been found that when using main pump 11 with such suction and discharge hoses having diameters of less than 4 inches, it is possible to achieve flow rates exceeding 75 gallons per minute through the system without cavitation occurring in the pump. Preferably, the fuel is circulated through the inflow and outflow passages at a rate of 80 to 110 gallons per minute. This process is continued until it is believed that a substantial amount of particulates and other impurities have been removed from the tank.

Figure 5:
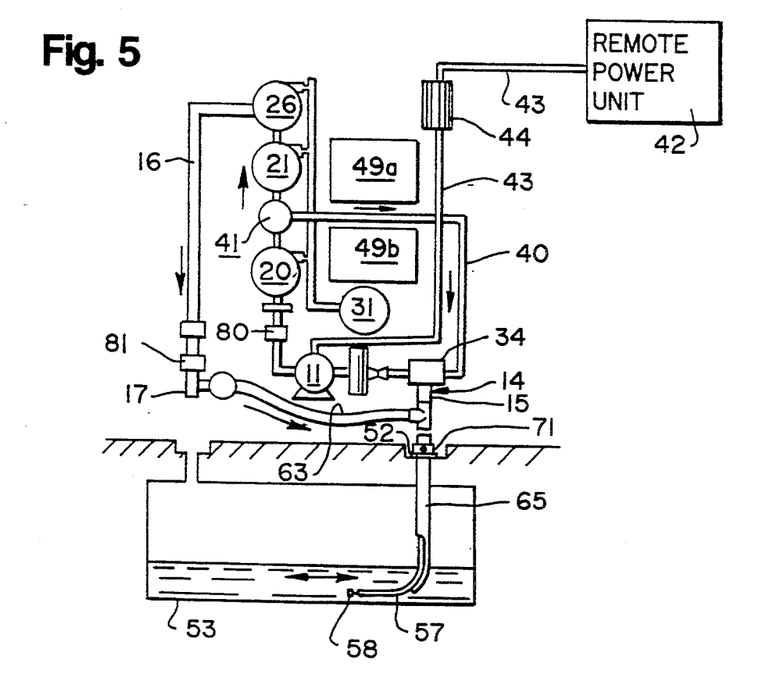
FIG. 5 is a schematic view of the apparatus and an underground liquid fuel storage tank illustrating the dislodging, suspending, and removing of particulates from the tank in the coaxial stage of the present invention.

The second mode of operation is illustrated in FIG. 5 and this configuration is used for dislodging, suspending, and removing particulates from the tank using only coaxial hose 57. In this configuration, the proximal end of hose 57 is connected to intake 15 with outer passage 59 in communication with inflow passage 14, and flexible hose 63 is used to connect outflow passage 16 to inner passage 60 of coaxial hose 57. Coaxial hose 57 is introduced through access opening 52 into tank 53 by inserting the hose through guide tube 65 which is prepositioned therein. Coaxial hose 57 is inserted until nozzle 61 is located adjacent the bottom of the tank beneath the fuel level. Once coaxial hose 57 is properly positioned, remote power source 42 is used to power main pump 11 and draw fuel into the ports 62 and through outer passage 59 of the coaxial hose. This fuel is drawn into inflow passage 14 along with particulates where it is circulated through the filtering means, the reservoir (static relaxation tank 26), outflow passage 16, and then reintroduced into the tank at high velocity through flexible hose 63, inner passage 60, and nozzle 58. Solid arrows in FIG. 9 illustrate the directions of flow of fuel through inner passage 60 and discharge ports 61, and through outer passage 59, during this second mode of operation. In a preferred embodiment, discharge ports 61 are circular in nature and a plurality of such ports are positioned equidistant around a periphery of nozzle 58. Discharge ports 61 preferably form an angle to a longitudinal axis of nozzle 58 but face somewhat in the direction of ports 62. Such a configuration results in the discharged fuel directing particulates, sludge, and other debris generally towards port 62 where such particulates are drawn into the apparatus for filtering. During this mode of operation, coaxial hose 57 and nozzle 61 are advanced back and forth along the bottom of the tank so that the fuel being discharged at high velocity through ports 61 will impact particulates and other sediment in the tank and suspend the particulates in the fuel for subsequent filtering and removal.

In this embodiment and mode of operation, jet pump means 34 is required in order to achieve high flow rates and velocities of the fuel flowing through the apparatus. Such flow rates and velocities can be achieved in the apparatus of the present invention without cavitation occurring in the pump as jet pump means 34 imparts enough NPSH into the fuel flowing through inflow passage 14 to reduce the amount of NPSH required from main pump 11 to such a level that vaporization of the fuel will not occur in the pump. A minor portion of the fuel diverted by control valve 41 and redirected through conduit 40 back to jet pump 34 increases the rate and velocity of the fuel flowing through inflow passage 14 to reduce the NPSH required from pump 11, thus preventing cavitation in pump 11. During preferred operating conditions, fuel is drawn in through ports 62 at a flow rate of at least 25 gallons per minute, and preferably at a flow rate of 35 to 50 gallons per minute, and then discharged through discharge ports 61 at a velocity of at least 25 feet per second, and preferably at a velocity of 35 to 50 feet per second.

The third mode of operation is illustrated in FIG. 6 in which a sweeping operation is performed. Hose 50 has its proximal end connected to intake 15 and its distal end includes inlet 51 for drawing fuel into the hose. Guide tube 65 is passed through access opening 64 and coaxial hose 57 is inserted therethrough. Although it is preferred if coaxial hose 57 is used in this embodiment as it negates the need for an additional hose, a single passage hose similar to hose 50 can be used instead during this stage if desired. Flexible hose 63 connects inner passage 60 of coaxial hose 57 to outflow passage 16 and outflow passage 16 connects directly with outer passage 59 so that fuel may be discharged from outflow passage 16 through both the inner and outer passages of coaxial hose 57 as depicted by dashed arrows in FIG. 9. After coaxial hose 57 and hose 51 are introduced into the tank, main fuel pump 11 is operated to withdraw fuel from the tank by means of inlet 51 at the end of the hose 56. As previously discussed, the fuel passes through the inflow and outflow passages and the filtering means, and then is introduced into reservoir 26. The fuel is then withdrawn from the reservoir and reintroduced into the tank at a high velocity through both the inner and outer passages of the coaxial hose and nozzle. Jet pump means 34 is not critical during this stage. Preferably, the fuel is circulated during this stage at a flow rate of at least 70 gallons per minute, and preferably at 80 to 110 gallons per minute. Such high flow rates are advantageous as less time is required to ensure that all particulates are removed from the tank. A conventional flow rate meter 72 can be placed in outflow passage 16 for measuring the exact flow rate of the system.

Figure 11:
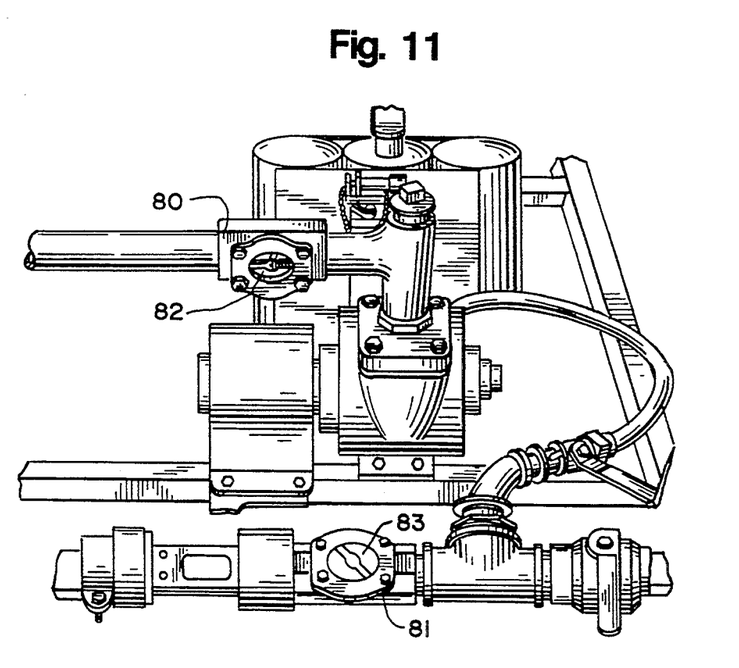
FIG. 11 is a perspective view of a pair of sight gauges to allow viewing of fluid passing through the passages of the apparatus.

The apparatus is preferably provided with a testing means for evaluating the amount of particulates entrained in the fuel which passes through the apparatus. One embodiment of such a testing means takes the form of a pair of sight flow gauges 80 and 81 which are most clearly seen in FIG. 11. Sight gauges 80 and 81 are conventional and are each provided with respective translucent portions 82 and 83 which allow viewing of the fluid passing through the adjacent passages. Sight flow gauge 80 is positioned adjacent pump outlet 13 for allowing viewing of fluid being discharged through outlet 13. Such a location is advantageous as it allows viewing of the fuel prior to it being filtered. Sight flow gauge 81 is positioned on outflow passage 16 after the filtering means to allow viewing of the fluid passing therethrough after particulates and other impurities have been filtered from the fuel. Preferably, sight gauges 80 and 81 are placed in close proximity so that an operator may simultaneously view both sight gauges for ready comparison of the fuel that is being withdrawn from the tank with the filtered fuel which is being returned to the tank. Another embodiment of such a testing means may take the form of a pair of gravimetric samplers 84 and 85 as shown in FIG. 1. Samplers 84 and 85 are adapted to withdraw small amounts of fluid passing through the respective passages so that the fluid can be tested to determine the amount of particulates or impurities entrained therein. Samplers found to be suitable for this use are available from Millepore Corp., Bedford, Me. For example, the samplers can be configured to direct a flow of fuel, into a 1 gallon container, having a filter membrane of 1 to 2 inches and having a 1 to 10 micron rating thereon. Fluid can then be directed through the sampler to determine whether a full gallon can pass through the membrane without the membrane becoming clogged, which would demonstrate that the suspended particulates had been successfully removed from the fuel. It is believed that such samplers are very effective for determining the length time that the system needs to be operated to ensure that the tank is effectively cleaned of all particulates, impurities and other debris.

While in the foregoing, we have disclosed details of the invention in considerable detail for purposes of illustration, it will be understood that many of these details may be varied without departing from the spirit and scope of the invention.

We claim:

1. An apparatus for cleaning and removing particulates from underground liquid fuel storage tanks having restricted access openings to the interiors thereof, comprising a main fuel pump having an inlet and outlet;

first passage-providing means defining an inflow passage communicating with said pump inlet for conducting fuel to said pump from an underground liquid fuel storage tank;

second passage-providing means defining an outflow passage communicating with said pump outlet for returning fuel from said pump to the same underground tank;

filtering means along said second passage-providing means for filtering fuel flowing therethrough;

jet pump means having a discharge nozzle in said first passage-providing means directed towards said pump inlet for increasing the rate and velocity of fuel flowing through said inflow passage from the underground tank to said main pump;

said jet pump means also having a fuel intake;

flow-diverting conduit means for conducting a minor portion of the fuel flowing through said outflow passage, after such fuel is partially filtered by said filtering means, to said intake of said jet pump means; and hose means for connecting said inflow and outflow passages to the interior of an underground liquid fuel storage tank.

2. The apparatus of claim 1 in which said flow-diverting conduit means includes control valve means for diverting said minor portion of said fuel to said jet pump means in an amount that increases the rate and velocity of the fuel flowing through said inflow passage.

3. The apparatus of claim 1 in which said hose means comprises a coaxial hose having an inner and outer passage, a proximal end with said inner passage in communication with said outflow and said outer passage in communication with said inflow, and a distal end having a nozzle with discharge and intake ports respectively in communication with said inner and outer passages, said main pump and said jet pump means being operable to draw fluid from said tank into said intake ports and through said outer passage at a flow rate of at least 25 gallons per minute and discharge said fluid back into said tank through said inner passage and said discharge ports at a velocity of at least 25 feet per second.

4. The apparatus of claim 3 in which said main pump and said jet pump means are operable to draw fluid from said tank into said intake ports at a flow rate of approximately 35 to 50 gallons per minute and discharge said fluid back into said tank through said discharge ports at a velocity of approximately 35 to 50 feet per second.

5. The apparatus of claim 4 in which said coaxial hose has an outer diameter of less than 4 inches.

6. The apparatus of claim 5 in which said coaxial hose has a length of a least 25 feet.

7. The apparatus of claim 1 in which said tube means comprises a first hose having a proximal end in communication with said outflow and a distal end including nozzle means for discharging fluid into said tank, and a second suction hose having a proximal end in communication with said inflow and a distal end including inlet means for drawing fluid from said tank into said suction tube.

8. The apparatus of claim 7 in which said first and second hoses have outer diameters of less than 4 inches.

9. The apparatus of claim 8 in which said first and second hoses each have a length of at least 25 feet.

10. The apparatus of claim 7 in which said pumping means is operable to draw fluid into said inlet means at a flow rate of approximately 80 to 110 gallons per minute.

11. The apparatus of claim 1 in which said system further comprises testing means for detecting the amount of particulates present in said fluid while flowing through said outflow passage both before flowing through said filtering means and after flowing through said filtering means.

12. The apparatus of claim 11 in which said testing means comprises a first sight gauge positioned to allow viewing of fluid passing through said outflow passage prior to said fluid passing through said filtering means and a second sight gauge positioned to allow viewing of fluid passing through said outflow passage after said fluid passes through said filtering means.

13. The apparatus of claim 12 in which said first and second sight gauges are closely spaced to allow simultaneous viewing thereof.

* * * * *